2,851,490

GUANYL ALIPHATIC MONO-CARBOXYLIC ACIDS

Henry C. Godt, Jr., St. Louis, and John F. Quinn, Kirkwood, Mo., assignors to Monsanto Chemical Company, St. Louis, Mo., a corporation of Delaware No Drawing. Application April 20, 1955
Serial No. 502,735

7 Claims. (Cl. 260—534)

This invention relates to new compositions of matter and more specifically pertains to guanyl substituted aliphatic monocarboxylic acids and a method for their preparation.

It has now been discovered that guanyl substituted aliphatic monocarboxylic acids having the formula

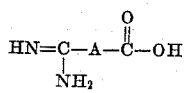

wherein A is a divalent open chain aliphatic group and preferably a divalent open chain saturated hydrocarbon group containing 2 to 10 carbon atoms, can be readily and conveniently prepared by a metal-acid reduction of the corresponding monoamidoxime (aminohydroxyimino aliphatic carboxylic acid). It is also preferred that the metal-acid reduction be carried out in the presence of a reaction diluent. In most cases the acid, an aqueous solution of the acid or the medium from which the acid is produced, will be suitable for the reaction diluent. The temperature at which the reduction is carried out is not critical except where it is desired to carry out the process in an economical period of time. In general, the process of this invention when carried out at temperatures above 50° C. and preferably at temperatures of from 90° to 120° C. will be found to proceed satisfactorily. Higher temperatures can be employed but will be found to offer little or no advantage.

The monoamidoxime reactant employed in the process of this invention can be prepared by the addition of hydroxylamine to a cyano monocarboxylic acid or can be obtained from the catalytic reduction of a mononitrolic acid as described in copending application, Ser. No. 502,730, filed April 20, 1955. The process described in this copending application comprises the reduction of a monocarboxylic mononitrolic acid under mild hydrogenation conditions at atmospheric pressure and room temperature. More specifically, adipomonoamidoxime is prepared by reduction of adipomononitrolic acid (6-nitro-6-hydroxy-imino hexanoic acid) in glacial acetic acid at 25° C. and atmospheric pressure in the presence of a catalyst comprising platinum in charcoal. The resulting solution is triturated with acetone to precipitate the desired amidoxime.

As useful metal-acid reduction systems for the process of this invention, there can be employed such systems as for example zinc and acetic acid; zinc and formic acid; either per se or liberated in situ; zinc and hydrochloric acid; tin and hydrochloric acid; and zinc and phosphoric acid among others. The acid can be used in an aqueous solution or in the case of the organic acids, the acid per se can be used as the reaction medium. For example, aqueous acetic acid solutions containing from 80% to 5% water can be employed or glacial acetic acid can be employed both as the diluent and the acid for the reduction systems.

The following examples are intended to be illustrative of this invention and are not intended as a limitation thereon.

Example I

In a suitable reaction vessel there is dissolved 6.4 parts by weight of adipomonoamidoxime (6-amino-6-hydroxyimino hexanoic acid) in 105 parts by weight of glacial acetic acid. To this solution there is added 13 parts by weight of zinc dust and the resulting mixture is stirred and heated to 105° C. and there maintained for 12 hours. Thereafter the resulting reaction mixture is filtered and then heated under reduced pressure to remove acetic acid and water formed during the reaction. The residual material is a thick oil which triturated with methanol solidifies. The solid product is recovered by filtration, dissolved in a minimum amount of warm water, and treated with hydrogen sulfide to precipitate the zinc as zinc sulfide, the resulting aqueous slurry is filtered, the filtrate decolorized with activated carbon and diluted with an equal volume of methanol. To the resulting aqueous medium there was added diethyl ether and a precipitate forms. The addition of the ether is continued until no further precipitate is noted. This required about 142 parts by weight of ether. The precipitate is recovered by filtration and dried. In this manner 5.2 parts, a 90% yield of a product identified as 5-guanyl pentanoic acid (6-amino-6-imino hexanoic acid) is obtained. This product had a melting point of 262° C. with decomposition.

Example II

The process of Example I is repeated except that an aqueous solution of formic acid is employed as the reaction diluent and as the source of the acid for the zinc and acid reduction medium. From this process a good yield of 5-guanyl pentanoic acid (6-amino-6-imino hexanoic acid) is obtained.

Example III

In a suitable reaction vessel there is added 35 parts by weight of concentrated hydrochloric acid (36% HCl) and 70 parts by weight of water. To the resulting dilute hydrochloric acid solution there is added 3.2 parts of adipomonoamidoxime and this mixture is stirred and heated to 105° C. While the mixture is heating, 9.5 parts by weight of mossy granular tin are added thereto. The reaction mixture is maintained at 105° C. for about 8 hours. At the end of the 4th and 6th hour about 12 parts by weight of concentrated hydrochloric acid are added to the reaction mixture making a total of about 60 parts by weight of concentrated hydrochloric acid (36% HCl). After 8 hours of reaction, the resulting mixture is filtered and then heated under reduced pressure to remove the water therefrom. The residue is dissolved in 300 parts by weight of water. This solution is treated with hydrogen sulfide to precipitate the sulfides of tin. The resulting aqueous mixture is filtered and the filtrate decolorized with activated carbon and the decolorized filtrate combined with an equal volume of methanol. To the resulting aqueous methanol solution there is added ether until a precipitate no longer forms. By this process an excellent yield of 6-amino-6-imino hexanoic acid (5-guanyl pentanoic acid) is obtained.

By following any one of the above processes 5-amino-5-hydroxy-imino pentanoic acid can be reduced to 4-guanyl butyric acid (5-amino-5-imino pentanoic acid) or 7-amino-7-hydroxyimino heptanoic acid can be reduced to 6-guanyl hexanoic acid. Likewise, any of the other guanyl substituted aliphatic monocarboxylic acids having the formula hereinbefore set forth as 3-guanyl propionic or 11-guanyl undecanoic acid can be prepared by the metal-acid reduction of the corresponding monoamidoximes.

The guanyl substituted aliphatic monocarboxylic acids of this invention can be employed as intermediates in the synthesis of other organic chemical compounds in substantially the same manner as guanyl substituted aliphatic compounds are employed. For example, the compounds of this invention can be reacted with alkyl halides or aryl halides to prepare N-alkyl or N-aryl substituted derivatives which have useful bacteristatic activity and many of which also have useful therapeutic activity. Also, the guanyl substituted aliphatic monocarboxylic acids of this invention can be reacted with aromatic sulfonic acids and especially the amino-substituted aromatic sulfonic acids to prepare sulfonamides useful as pharmaceuticals. The guanyl substituted aliphatic monocarboxylic acids of this invention also can be reacted with aldehydes. The reaction of the guanyl substituted aliphatic monocarboxylic acids with formaldehyde will result in a compound having a carboxylic acid group and a methylol group.

It is understood that the above description is given by way of illustration only and not by limitation, for other embodiments of the process and products within the spirit of this invention will be obvious to those skilled in the art.

What is claimed is:

1. A guanyl substituted aliphatic monocarboxylic acid having the formula,

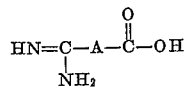

wherein A is a divalent open-chain saturated hydrocarbon group containing 2 to 10 carbon atoms.

2. 6-amino-6-imino hexanoic acid.

3. The process for preparing an omega-guanyl aliphatic monocarboxylic acid having the formula,

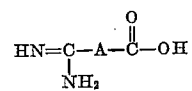

wherein A is a divalent open-chain saturated hydrocarbon group containing 2 to 10 carbon atoms, which comprises reducing the corresponding amidoxime in a metal-acid reduction medium at a temperature above 50° C.

4. The process for preparing an omega-guanyl aliphatic monocarboxylic acid having the formula,

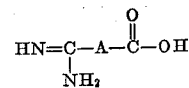

wherein A is a divalent open-chain saturated hydrocarbon group containing 2 to 10 carbon atoms which comprises reducing the corresponding amidoxime in the presence of zinc and acetic acid at a temperature above 50° C.

5. The process for preparing an omega-guanyl aliphatic monocarboxylic acid having the formula,

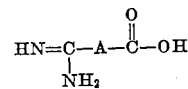

wherein A is a divalent open-chain saturated hydrocarbon group containing 2 to 10 carbon atoms which comprises reducing the corresponding amidoxime in the presence of tin and hydrochloric acid at a temperature above 50° C.

6. The process for preparing 6-amino-6-imino hexanoic acid comprising the reduction of 6-amino-6-hydroxyimino hexanoic acid with a metal-acid reduction system comprising zinc and acetic acid at a temperature of from 90° to 120° C.

7. The process for preparing 6-amino-6-imino hexanoic acid comprising the reduction of 6-amino-6-hydroxyimino hexanoic acid with a metal-acid reduction system comprising tin and hydrochloric acid at a temperature of from 90° to 120° C.

References Cited in the file of this patent

UNITED STATES PATENTS

| | | |
|---|---|---|
| 2,375,611 | Barber et al. | May 8, 1945 |
| 2,389,681 | Mikeska | Nov. 27, 1945 |
| 2,509,198 | Moore | May 30, 1950 |

OTHER REFERENCES

Wagner et al.: Syn. Org. Chem. (1953), p. 654.